United States Patent
Singer et al.

(10) Patent No.: US 6,324,625 B1
(45) Date of Patent: Nov. 27, 2001

(54) ROTATING RATIONED BUFFER REFRESH

(75) Inventors: Neil Singer, Lexington; Kang-Sen Lu, Acton, both of MA (US)

(73) Assignee: Fujitsu Network Communications, Inc., Richardson, TX (US)

(*) Notice: Subject to any disclaimer, the term of this patent is extended or adjusted under 35 U.S.C. 154(b) by 0 days.

(21) Appl. No.: 09/270,384

(22) Filed: Mar. 16, 1999

(51) Int. Cl.$^7$ .................................................. G06F 12/08
(52) U.S. Cl. ............................ 711/154; 710/52; 711/129; 711/133
(58) Field of Search ................................. 711/129, 133, 711/134, 135, 153, 156, 159, 165, 170, 173; 710/52, 56, 260

(56) References Cited

U.S. PATENT DOCUMENTS

| | | | |
|---|---|---|---|
| 5,611,071 | * | 3/1997 | Martinez, Jr. . |
| 5,748,629 | | 5/1998 | Caldara et al. . |
| 5,781,533 | | 7/1998 | Manning et al. . |
| 5,872,769 | | 2/1999 | Caldara et al. . |
| 5,896,511 | | 4/1999 | Manning et al. . |
| 5,898,671 | | 4/1999 | Hunt et al. . |
| 5,916,309 | * | 6/1999 | Brown et al. ........................... 710/52 |
| 5,920,732 | * | 7/1999 | Riddle . |
| 5,958,040 | * | 9/1999 | Jouppi .................................. 712/207 |
| 5,982,771 | | 11/1999 | Caldara et al. . |
| 6,073,190 | * | 6/2000 | Rooney .................................. 710/56 |
| 6,205,501 | * | 3/2001 | Brief et al. ........................... 710/100 |

FOREIGN PATENT DOCUMENTS

| | | |
|---|---|---|
| 97/04555 | 6/1997 | (WO) . |
| 97/04561 | 6/1997 | (WO) . |

OTHER PUBLICATIONS

Bhatia, Subbash, "Performance Analysis of Congestion Management Schemes for Streams Base Communications Systems." IEEE 1992.*

Affidavit of Neil Singer executed on Oct. 19, 1999 along with Exhibits A and B.

* cited by examiner

Primary Examiner—Matthew Kim
Assistant Examiner—Christian P. Chace
(74) Attorney, Agent, or Firm—Weingarten, Schurgin, Gagnebin & Hayes LLP

(57) ABSTRACT

In accordance with the present invention a method and apparatus are disclosed in which each data stream of a plurality of data streams is assigned to a queue and each queue is allocated a predetermined maximum numbers of buffers. Once the queue has exhausted its supply of buffers, the data from the corresponding data stream is discarded until buffers are refreshed thereby allowing the remaining data streams to operate in a normal fashion. Accordingly, excessive buffer usage by an individual data stream is prevented, as well as excessive demand of other related system resources such as CPU time. The data stream which has had its data discarded will begin having its incoming data processed upon the next refresh operation providing the queue associated with that data stream has had additional buffers allocated. The discarded data is lost and is not recovered. The refresh operation is performed in a manner that provides prioritization of the queues and a high degree of fairness within each priority level. The refresh operation may be scheduled to happen synchronously, such as being synchronized to a real-time clock within the system, or it may be constructed to occur asynchronously. When the refresh operations occur asynchronously the refresh operation will occur more often in a lightly loaded system and less frequently in a heavily loaded system, thereby allowing data streams exhibiting high buffer demands access to available buffers while the idle data streams are not requiring free buffers.

15 Claims, 5 Drawing Sheets

ROTATING RATIONED BUFFER REFRESH

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

In many systems in which streams of data share an arrival medium, such as frame relay traffic streams arriving on different channels of a shared T1 line or Asynchronous Transfer Mode (ATM) traffic streams arriving from a shared ATM switch fabric, the traffic streams share a common buffer pool. In such a system the possibility exists for one of the traffic streams to request and use all of the available free buffers while starving the remaining traffic streams and precluding some data streams from obtaining buffers. One channel can thus consume all the available free buffers and prevent the remaining channels from obtaining free buffers that they may require. Accordingly, performance of the remaining channels as well as performance of the system as a whole may suffer. It would be desirable to provide a system wherein a single data stream is not allowed to allocate more than its share of free buffers and the remaining channels are not prevented from obtaining free buffers for their respective applications in accordance with defined limits for the respective data stream. Additionally, it would be desirable to provide a system which allocates free buffers to the data streams in an efficient and fair manner.

BRIEF SUMMARY OF THE INVENTION

In accordance with the present invention a method and apparatus are disclosed in which each data stream of a plurality of data streams is assigned to a queue and each queue is allocated a predetermined maximum numbers of buffers. Once the queue has exhausted its supply of buffers, the data from the corresponding data stream is discarded until buffers are refreshed thereby allowing the remaining data streams to operate in a normal fashion. Accordingly, excessive buffer usage by an individual data stream is prevented, as well as excessive demand of other related system resources such as CPU time. The data stream which has had its data discarded will begin having its incoming data processed upon the next refresh operation providing the queue associated with that data stream has had additional buffers allocated. The discarded data is lost and is not recovered. The refresh operation is performed in a manner that provides prioritization of the queues and a high degree of fairness within each priority level. The refresh operation may be scheduled to happen synchronously, such as being synchronized to a real-time clock within the system, or it may be constructed to occur asynchronously. When the refresh operations occur asynchronously the refresh operation will occur more often in a lightly loaded system and less frequently in a heavily loaded system, thereby allowing data streams exhibiting high buffer demands access to available buffers while the idle data streams are not requiring free buffers.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
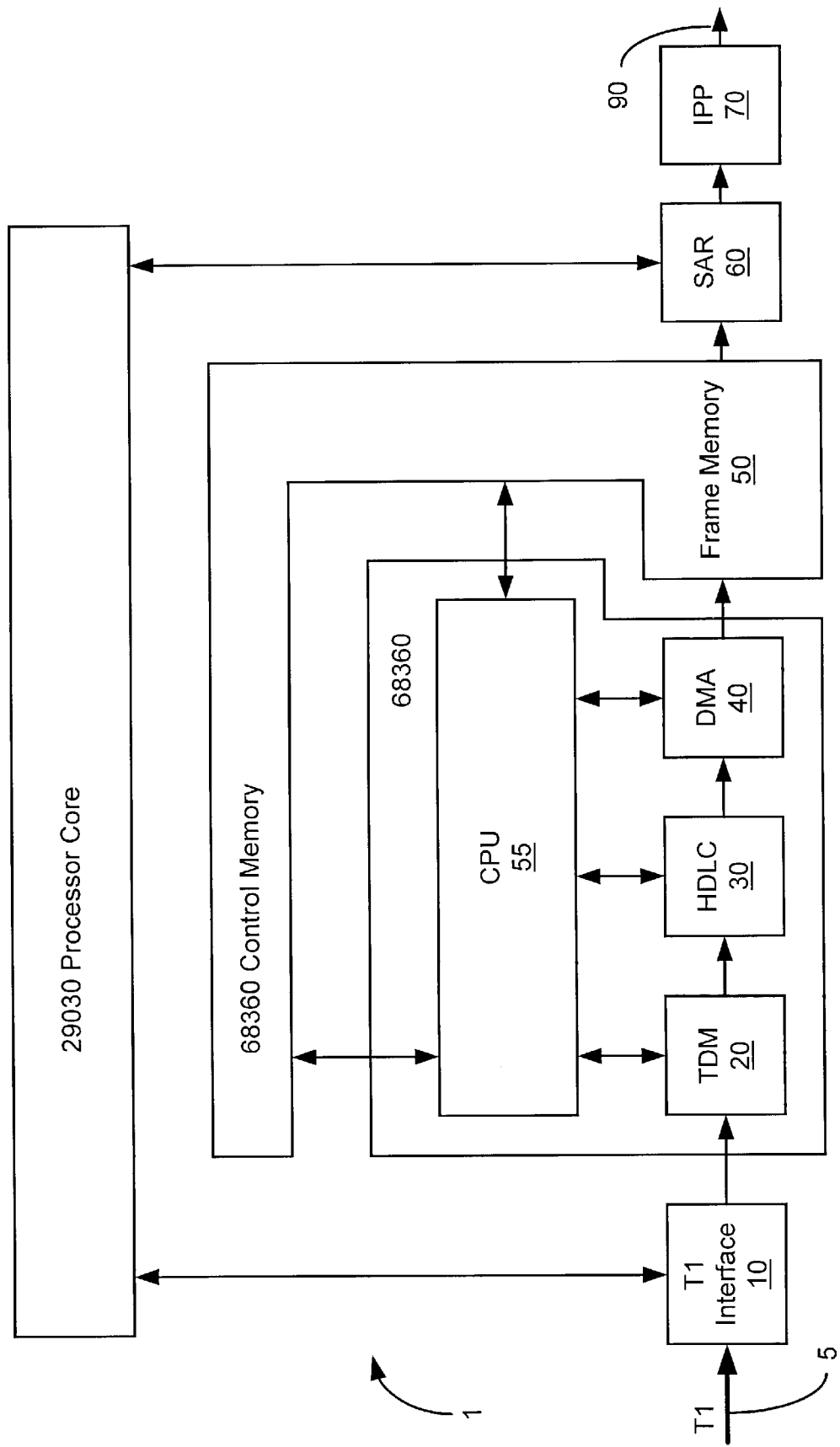
FIG. 1 is a block diagram of a system receiving frame relay data streams and sending an ATM data stream.

Referring to FIG. 1, a block diagram of a portion of a network switch is illustrated. FIG. 1 shows traffic flow at the input side of a switch adapted to receive Frame Relay data streams (such as T1 or E1 data streams) and operative to convert such data streams into a cell format such as that employed in the Asynchronous Transfer Mode (ATM) protocol.

An incoming data stream from a Frame Relay device on a T1 line 5 is shown coupled to a T1 interface 10. The data received from the T1 line comprises payload data, Frame Relay (FR) information, High Level Data Link Control (HDLC) information, the data channels and the associated T1 framing bits. The T1 interface 10 receives the data in the above-mentioned format and removes the T1 framing data. The interface also reports any physical layer alarms. The data now comprising the payload, the FR information, the HDLC information and the data channels are forwarded to the Time Domain Multiplexer (TDM) controller 20.

The TDM controller 20 receives the data from the T1 interface and demultiplexes selected channels into the incoming HDLC bit streams. The resulting data comprising the payload, the FR information and the HDLC information is forwarded to the HDLC controller 30.

The HDLC controller 30 validates the HDLC information which includes bit stuffing, flags and CRC-16 check bits. This HDLC information is verified and removed, and any errors conditions associated with the data are reported.

The data leaving the HDLC controller 30 comprises the payload and the FR information.

The HDLC data is forwarded to the DMA (Direct Memory Access) controller 40. At this juncture, the supply of buffers to handle the incoming data stream is controlled by a buffer rationing technique.

Figure 1A:
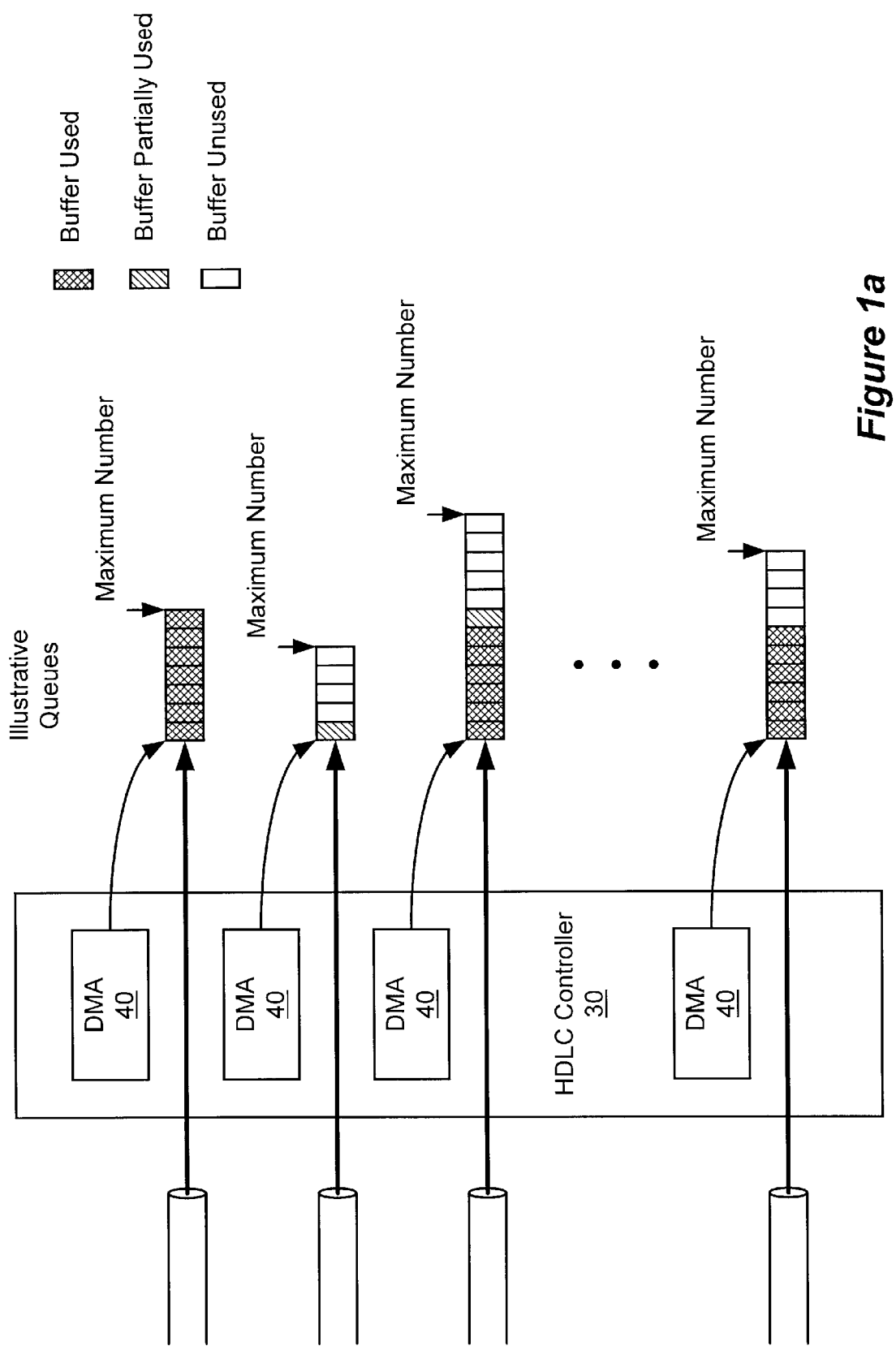
FIG. 1a is a diagram illustrating buffer storage in response to incoming frame relay traffic.

Referring to FIGS. 1 and 1a, an HDLC Controller 30 upon receiving data, passes the data through the DMA Controller 40 for storage in Frame Memory 50. More specifically, the HDLC Controller receives frame data until the end of frame is indicated by the receipt of an HDLC flag. As data is received, data is transferred 4 bytes at a time via DMA Controller 40 into Frame Memory 50. Data is being received simultaneously on multiple TDM channels by multiple HDLC Controllers 30 and stored within the Frame Memory 50 by corresponding DMA Controllers 40. All of the DMA Controllers associated with a single physical T1 or E1 line 5 draw their buffers from a common free buffer pool dedicated to that T1 or E1 line respectively. Each DMA Controller 40 has associated with it a single queue identifying the buffers that are available for use by the respective DMA Controller 40.

When the complete frame has been stored and the HDLC Controller 30 has verified the receipt of a valid CRC, the frame is processed further by CPU 55. The Processor Core supervises the operation and interaction of the plurality of 68360 processors, one of which includes the CPU 55 and another of which includes the CPU 155 of FIG. 2. Frames with invalid CRC are discarded. Frames with valid CRC have their DLCI (the Frame Relay Address) verified by the CPU 55. If the DLCI is not recognized the frame is discarded. If the DLCI of the frame is recognized, the CPU 55 performs frame relay processing and the SAR 60 performs frame segmentation to convert the frame to ATM cells.

To prevent a data stream associated with one of a plurality of data channels from utilizing free buffers at the expense of remaining data channels, a single DMA Controller 40 is associated with each of the plurality of data channels and each such controller is associated with a single queue which serves to identify buffers available for data storage for the respective data channel.

Each DMA Controller 40 has a control block containing the operational parameters necessary to operate the respective DMA Controller 40. Upon receipt of frame data, the DMA Controller 40 stores the data into a buffer identified by its control block. As bytes continue to be received, the data continues to be stored within the identified buffer until either the end of frame (HDLC Flag) is detected or the buffer is filled. In the event that the end of frame has been detected, the frame is passed to software for further processing. In the event the buffer has filled, the DMA Controller 40 utilizes the next buffer in its queue to store received data. If no further buffers are available within the respective queue, the DMA Controller discontinues receipt of incoming data for the respective channel.

Each time the beginning of a new frame is detected, the DMA Controller 40 requests a new buffer and stores that received data for that frame in the new buffer if a new buffer is available. If the beginning of a new frame is detected and no buffers are available in which to store the received data, the data is discarded and the frame is lost.

Free buffers are allocated to the queues associated with the DMA Controllers 40 in response to refresh events. At these refresh events, buffers from the free buffer pool are assigned to each such queue to bring the quantity of buffers within the respective queue up to the pre-specified maximum number for that queue if buffers are available within the free buffer pool. Thus, buffers that have been taken from the queues by the respective DMA Controllers 40 are replaced with buffers from the free buffer pool. When a DMA Controller 40 exhausts the supply of buffers assigned to its queue, further data from the corresponding data stream is discarded. Accordingly, the exhaustion of buffers on a particular queue does not affect the availability of buffers associated with any other queues. Thus the performance of data streams utilizing such other queues is unaffected. Data streams whose queues have been depleted will recommence storage of data after the next refresh event at which at least one buffer has been allocated to the respective queue.

In one embodiment refresh events occur periodically and are synchronized to a real time clock interval. In this embodiment, even if the CPU 55 is lightly loaded and buffers are available, service may be denied to certain data channels until the next synchronously occurring refresh event due to the length of the refresh period.

In another embodiment, refresh events occur asynchronously and the frequency of refresh events is inversely related to CPU 55 loading. The CPU 55 runs a series tasks involving the Frame Relay protocol. One of the tasks performed by the CPU 55 involves the performance of the refresh events as herein described. When the system is lightly loaded, the refresh events will occur more frequently since the other tasks will be completed more quickly. Thus, allocation of free buffers can be more responsive to demanding traffic streams on specific channels that might otherwise deplete their allocated buffers and thus be denied service.

The queues are identified within a circular list and are serviced within the order specified on that list. At each refresh event, if there are sufficient buffers available within the free buffer pool, each queue is replenished to a pre-specified number of free buffers which can vary from queue to queue depending upon the bandwidth of an associated group of channels. If there are insufficient buffers within the free buffer pool to replenish all queues within the circular list, then a number of queues are replenished until the available free buffers are exhausted. The position within the circular list where replenishment ceases is stored so that, at the next refresh event, replenishment can resume generally at the point where replenishment ceased. Upon depletion of the free buffer pool during the refresh event, alternative methods may be used. In one embodiment, partial replenishment may be prohibited in which case replenishment ceases with the last queue for which a sufficient number of free buffers is available to complete the replenishment. In this case, at the next refresh event at which sufficient free buffers have become available, replenishment resumes with the next queue on the circular list.

Alternatively, if an insufficient number of free buffers is available to complete the replenishment of a queue, that queue is partially replenished with whatever free buffers are available. The queue which was partially replenished may be replenished according to the following methods. In one method, the queue which was partially replenished, continues replenishment until that queue has cumulatively received the number of buffers originally required to replenish the queue at the time insufficient buffers were first encountered during a refresh event within the present circular list cycle. In a second method, replenishment continues with the partially replenished queue and an attempt is made to fully replenish the queue to the predetermined maximum number of free buffers. In this method, replenishment advances to the next queue on the circular list only when the current queue has been replenished to it predetermined maximum number of free buffers. In yet another method, at the next refresh event, replenishment continues at the queue following the queue that was partially replenished during the previous refresh event.

Data stored within the Frame Memory 50 by the DMA Controller 40 is accessed by the SAR controller 60, converted to ATM cells and transmitted to an ATM switch via the input port processor 70. The SAR controller 60 may comprise a commercially available SAR. One such SAR is identified as model number TNETA1570 and is commercially available from Texas Instruments, Inc. The data has thus been converted from a Frame format received on the T1 line 5 to an ATM cell format at the output of the input port processor 70.

Figure 2:
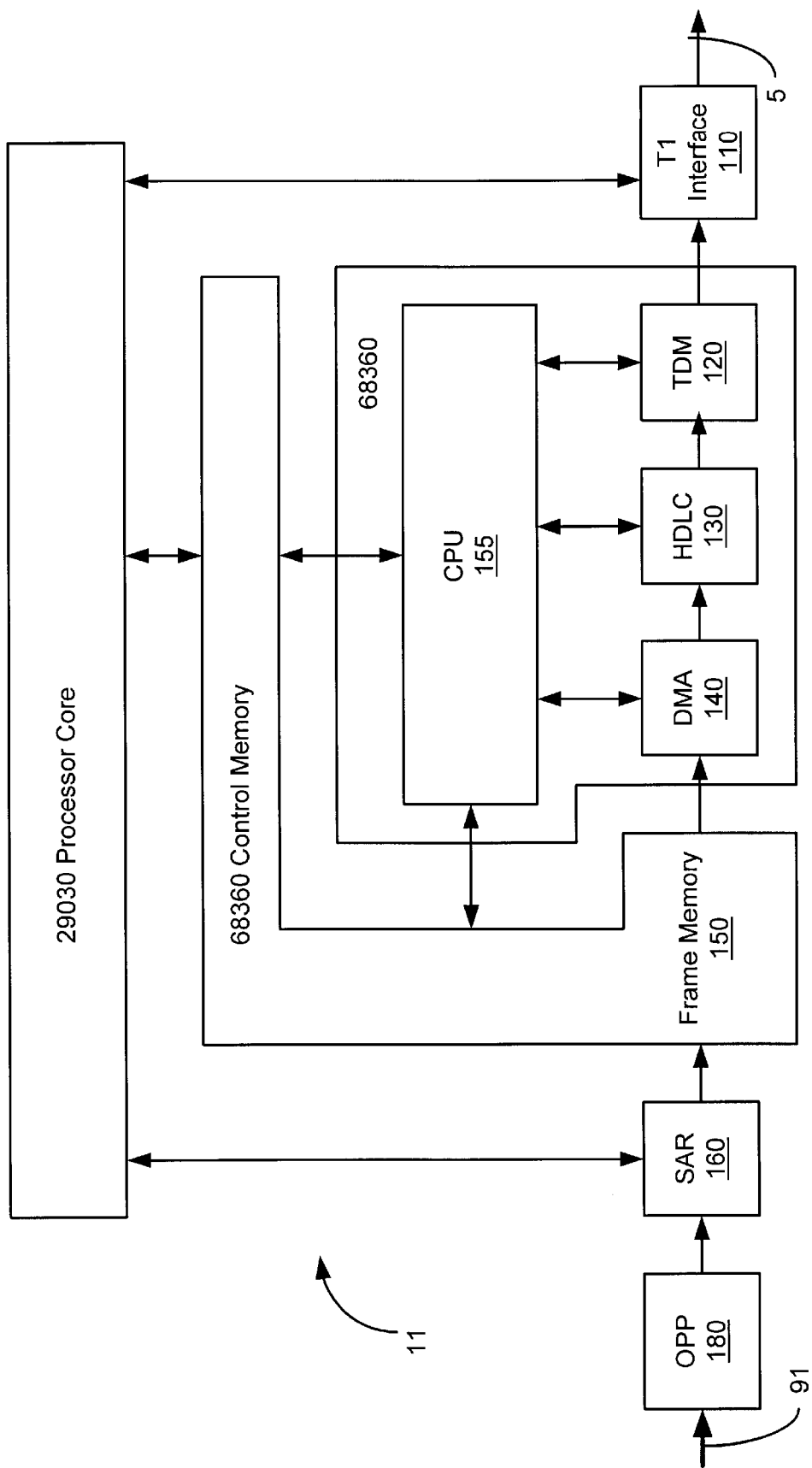
FIG. 2 is a block diagram of the system receiving an ATM data stream and sending Frame Relay data streams.
Figure 2A:
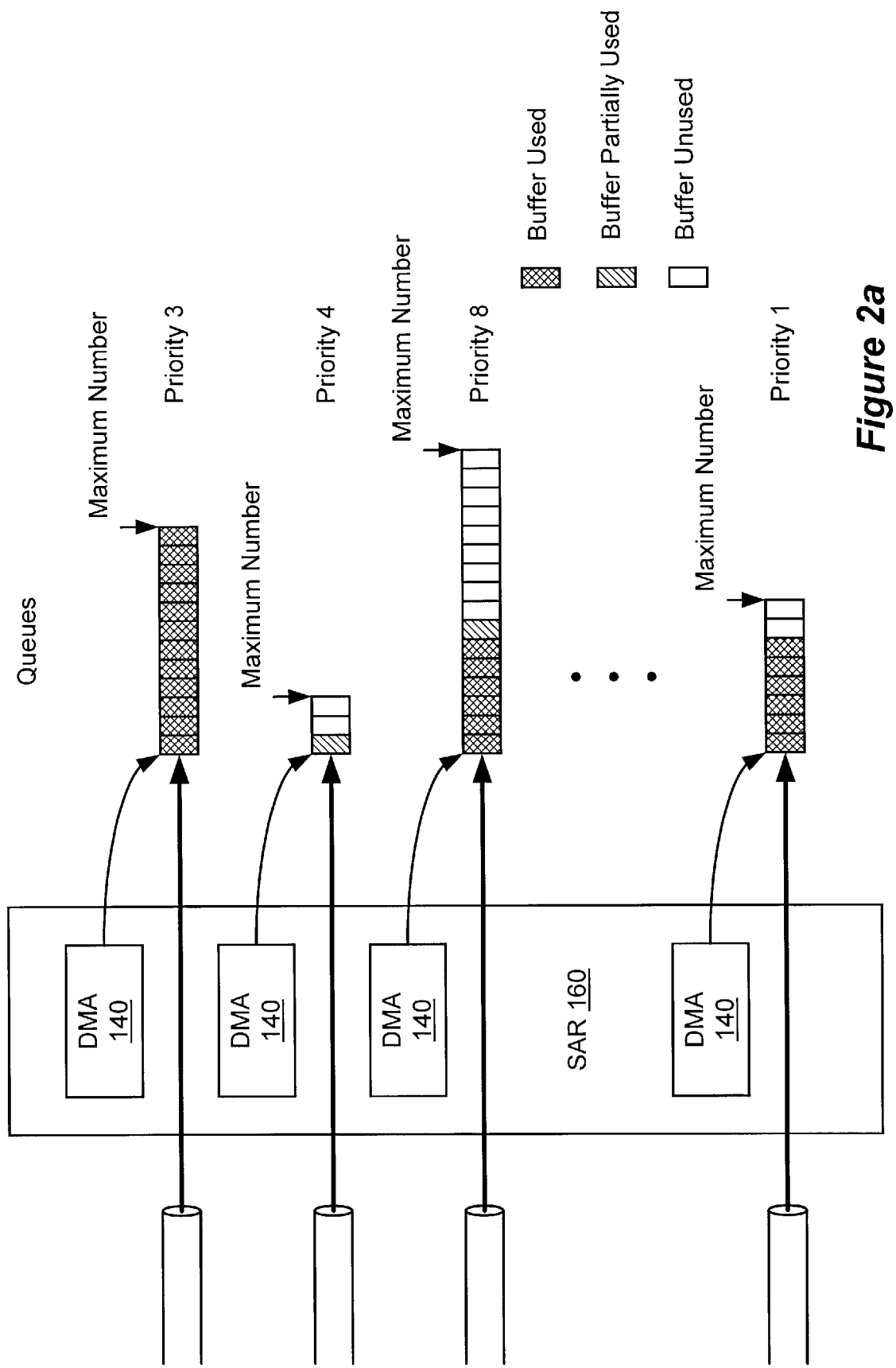
FIG. 2a is a diagram illustrating buffer storage in response to incoming ATM cell traffic.

FIGS. 2 and 2a illustrate the conversion of data received from an ATM crossbar switch from an ATM cell format to a frame format prior to transmission over a line and queues employed to service the various ATM traffic streams. Data is received from an ATM network crossbar switch over line 91. The Output Port Processor (OPP) 180 receives the incoming cell stream from the ATM crossbar switch. The OPP 180 forwards the data in an ATM cell to a SAR format 160 for reassembly.

The SAR 160 receives the data from the Output Port Processor 180, reassembles the frame per AAL5, verifies the AAL5 trailer and sends the data comprising the payload and FR information, to the Frame Memory 150. More specifically, the SAR receives incoming ATM cells and validates the ATM address (VPI/VCI). Cells having unrecognized addresses are discarded. For cells having VPI/VCI addresses which are recognized, the SAR uses multiple queues as described below and assigns buffers from those queues to store incoming traffic for the respective data streams. Buffers from a free buffer pool are dynamically allocated to those queues in accordance with the present invention via a rotating rationed refresh technique on either a periodic or an a-periodic basis as herein discussed.

To prevent a single data stream from utilizing free buffers at the expense of the remaining data streams, the SAR 160 utilizes a plurality of queues that identify buffers available for data storage. The SAR 160 receives each ATM cell. The SAR performs a lookup operation on the VPI/VCI address of the cell to determine if cell is associated with an established connection. More specifically, the SAR determines whether a DMA engine has been assigned to the cells having that VPI/VCI address. If there is no DMA engine assigned to cells having that VPI/VCI address, the cell is discarded. If a DMA engine has been assigned to the VPI/VCI address, the cell is processed as follows.

Each DMA engine has a control block containing the operational parameters necessary to operate the respective DMA engine. One queue is associated with each DMA engine. The queue contains the identification of free buffers available for use by that DMA engine. Although each DMA engine is associated with one queue, multiple DMA engines may share a single queue.

Upon receipt of a cell at the SAR 160 for which a DMA engine has been assigned, the DMA engine needs to determine if the DMA engine already has a buffer identified in which to store the cell or if the DMA engine needs to obtain a new buffer in which to store the cell. When a new buffer is needed, the DMA engine accesses the queue associated with that DMA engine to obtain the identification of the next available buffer. If no buffer is available within the queue, the cell data is discarded. If a buffer is available, then that buffer's identification is removed from the queue and assigned to the DMA engine that matches the VPI/VCI address of the cell. The DMA engine then copies the cell data into that buffer.

Each time a cell arrives that is associated with a new frame, the DMA engine requests a new buffer and stores that cell in the new buffer if the new buffer is available. Cells associated with a partially received frame are stored in a buffer already in use by that DMA engine if sufficient space remains. If insufficient space remains within the buffer in use by the DMA engine, a new buffer is requested and the data is stored in the new buffer if the new buffer is available. If a cell arrives and no buffers are available in which to store the cell, the cell is discarded and the frame is lost.

The above-described buffers are allocated into the queues associated with the DMA engines in response to refresh events. At these refresh events, buffers from the free buffer pool are assigned to each such queue to bring the quantity of buffers within the respective queue up to the pre-specified maximum number for that queue if buffers are available within the free buffer pool. Thus, buffers that have been taken from the queues by the respective DMA engines are replaced with buffers from the free buffer pool. When a DMA engine exhausts the supply of buffers assigned to its queue, further data from the corresponding data stream is discarded. Accordingly, the exhaustion of buffers on a particular queue does not affect the availability of buffers associated with any other queues. Thus the performance of data streams utilizing such other queues is unaffected. Data streams whose queues have been depleted will recommence storage of data after the next refresh event at which at least one buffer has been allocated to the respective queue.

In one embodiment refresh events occur periodically and are synchronized to a real time clock interval In this embodiment, even if the CPU is lightly loaded and buffers are available, service may be denied to certain data streams until the next synchronously occurring refresh event due to the length of the refresh period.

In another embodiment, refresh events occur asynchronously and the frequency of refresh events is inversely related to CPU loading. A CPU 155 runs a series tasks involving the Frame Relay protocol. One of the tasks performed by the CPU 155 involves the performance of the refresh events as herein described. When the system is lightly loaded, the refresh events will occur more frequently since the other tasks will be completed more quickly. Thus, allocation of free buffers can be more responsive to demanding traffic streams that might otherwise deplete their allocated buffers and thus be denied service.

The refresh operation is enhanced by segregating queues into a plurality of priority levels and servicing the queue levels in order of priority. Each queue is assigned a priority level, dependent on the type of traffic the data stream is expected to experience. For example, priority level 1 may be assigned to data channels handling data streams which are fully guaranteed; priority level 2 to data streams which are characterized as low loss, top priority; priority level 3 to data streams which are characterized as low delay, top priority; priority level 4 to data streams which are characterized as low loss, middle priority; priority level 5 to data streams which are characterized as low delay, middle priority; priority level 6 to data streams which are characterized as low loss, bottom priority; priority level 7 to data streams which are characterized as low delay, bottom priority; and priority level 8 to data streams which are characterized as best effort only. Multiple queues may be assigned to the same priority level.

When a refresh event occurs the queues that have been assigned the highest priority level are allocated buffers first from the free buffer pool. Once each queue in the priority level has been allocated the prespecified maximum number of buffers assigned to the queue (referred to as topping off) the buffer queues the next lower priority level are topped off if sufficient free buffers are available. This process is repeated for as long as there are free buffers in the free buffer pool or until all the queues at every priority level have been topped off.

Within each priority level queues are arranged as a circular list. To achieve fairness among queues, the methods described above in connection with FIGS. 1 and 1a may be employed at each priority level such that replenishment of queues at the respective level continues at the point at which replenishment ceased at the previous refresh event. In the above-described methods for achieving fairness within respective priority levels, each queue within a priority level is treated the same with respect to every other queue within the same priority level and will not be starved as a consequence of its location within the circular list.

Figure 3:
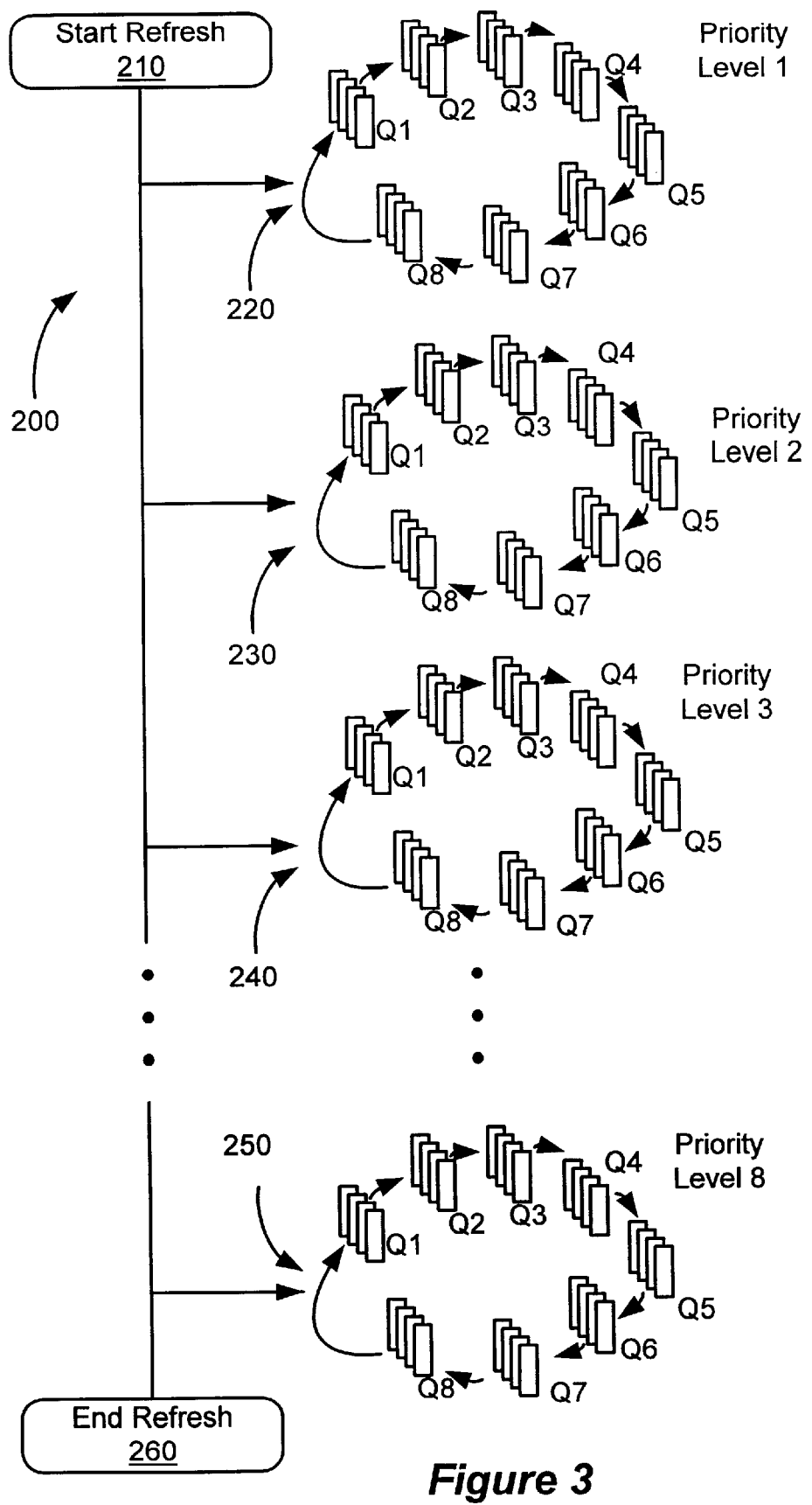
FIG. 3 is a diagram showing the rotating rationed refresh of the present invention.

Referring now to FIG. 3, a diagram of the rotating rationed refresh operation is shown. At the point where the DMA controller shown in FIG. 2 modifies the data, the refresh of the free buffers for the appropriate queues can be modified to provide increased fairness and improve the performance of the system.

In the illustrated embodiment eight priority levels are provided. Level 1 is the highest priority level and level 8 is the lowest. Buffer queues are assigned to a certain priority level. In the illustrated example each priority level includes eight queues, numbered one through eight. Initially each queue is assigned a predetermined maximum number of buffers to handle the incoming data streams associated with that queue. Each queue utilizes buffers allocated to that queue and decrements the number of buffers available as allocated buffers are utilized by the incoming data stream. At selected times, the queues have their number of buffers refreshed (topped off). For example, if the maximum number of buffers for a certain queue had been set at 4, upon a refresh event, that queue would again have four buffers available. If a particular queue used all of its allocated buffers prior to the occurrence of a refresh event, then the data from that data stream is discarded until a refresh event occurs and buffers are restored to the queue for that data stream. The queues are refreshed in order of priority level. During a refresh operation, the queues in level 1 220 are topped off to their maximum level first. The queues in level 2 230 are topped off next followed by the queues in level three 240. This process continues until the queues in level 8 250 are topped off or until no more free buffers are available for allocation.

For purposes of illustration assume that each queue in level 1 has a maximum number of ten buffers allocated respectively (although a different number of buffers may be allocated to each queue). Furthermore, assume that prior to the refresh event, queue 1 had utilized four of its buffers, queue 2 had utilized three of its buffers, and the remaining queues didn't use any of their respective buffers. At priority level 2, assume that queue 4 and queue 6 had each utilized three buffers and at priority level 3 queue 6 had utilized one buffer and queue 7 utilized six buffers. Finally, assume that there are sixteen buffers available in the free buffer pool.

The refresh operation would start at the first queue in priority level 1 and allocate four buffers from the free buffer pool to bring queue 1 back to its maximum number of free buffers (10). The free buffer pool would then have twelve buffers. The refresh operation would continue with queue 2 of level 1 and three buffers would be allocated to queue 2, leaving nine buffers in the free buffer pool. Queues 2 through 8 in priority level 1 did not utilize any buffers during the period between refresh events and thus each still has the maximum number of free buffers allocated to the respective queue. The refresh operation therefore continues with the next highest priority level, level 2. Queue 4 of level 2 is topped of by having three buffers allocated, leaving six buffers in the free buffer pool. Queue 6 is next allocated 3 buffers leaving three buffers in the free buffer pool. The other priority level 2 queues remain at their maximum buffer level so no buffers are allocated from the free buffer pool to such queues. The refresh operation therefore continues with priority level 3.

At level 3 queue 6 is allocated one buffer, leaving two buffers in the free buffer pool. The remaining two buffers are allocated to queue 7. Since queue 7 had utilized six buffers in the respective refresh interval it required six buffers to be completely topped off, however only two buffers were available. Since there are no more free buffers available, the refresh operation is terminated.

During the next refresh operation that proceeds through priority level 1 and 2 to priority level 3, the first queue to be topped off will be queue 7, since the prior refresh event completely topped off queue 6 but failed to completely top off queue 7. In this manner all the queues within a priority level are treated fairly and no queue within a priority level has priority over another queue within the same priority level by virtue of its position in the refresh ring.

In the foregoing manner a single data stream at a given priority level is not allowed to prevent the remaining data streams at that priority level from obtaining access to the buffer pool. By assigning each data stream a respective queue and a maximum number of buffers, and prioritizing the queues, free buffers are allocated in a fair manner while assuring higher priority data streams are allocated free buffers first.

While the foregoing method and apparatus have been described in the context of a T1 data stream, the same techniques may be employed for other wide area network protocols including, without limitation, E1, T3 and E3 which are employed for Frame Relay data transport. Similarly, the presently described buffer allocation methods and apparatus may be employed in any system in which a common buffer pool needs to be shared among any computer processes requiring use of such buffers in a manner where it is desirable to protect the supply of buffers available to each such process from the demands created by each other such process.

Having described preferred embodiments of the invention it will be apparent to those of ordinary skill in the art that other embodiments of and variations to the above described methods and apparatus may be employed. Accordingly, the invention should not be limited to the described embodiments but rather should be limited solely by the scope and spirit of the appended claims.

We claim:

1. A method of allocating buffers comprising the steps of:

receiving at an input port a plurality of data streams which share a buffer pool having a plurality of free buffers at least at some times;

associating a queue for identifying selected ones of said free buffers with each of said plurality of data streams wherein each one of said queues is identified within a circular list of queue identifiers;

identifying, for each queue, a predetermined maximum number of buffers to be allocated to the respective queue from the plurality of free buffers within said buffer pool;

adding, at specified aperiodic refresh events, at least one additional free buffer from said buffer pool to at least one of said queues in the event at least one of said queues does not have allocated its respective predetermined maximum number of buffers;

utilizing buffers from said plurality of free buffers up to said maximum number for the respective data stream as data arrives;

temporarily ceasing data storage for each one of said plurality of data streams for which the predetermined maximum number of buffers for the respective data stream has been utilized between successive ones of said refresh events; and resuming storage of data for at least one of said plurality of data streams for which data storage ceased in response to the addition of said at least one additional free buffer to the queue associated with said at least one of said data streams for which data storage ceased.

2. The method of claim 1 wherein said receiving step comprises receiving a plurality of frame relay data streams.

3. The method of claim 1 wherein said receiving step comprises receiving a plurality of frame relay data streams selected from the group consisting of T1, E1, T3 and E3 data streams.

4. The method of claim 1 wherein said receiving step comprises receiving a plurality of ATM data streams.

5. The method of claim 1 wherein specified refresh events occur at a rate which is inversely related to CPU load.

6. A method of allocating buffers comprising the steps of:
receiving a plurality of data streams which share a buffer pool having a plurality of free buffers at least at some times;
associating a queue for identifying selected ones of said free buffers with each one of said plurality of data streams, wherein each one of said queues is identified within a circular list of queue identifiers;
identifying, for each queue, a predetermined maximum number of buffers to be allocated to the respective queue from the plurality of free buffers within said buffer pool;
adding, at specified refresh events, at least one additional free buffer from said buffer pool to at least one of said queues in the event said at least one of said queues does not have allocated its respective predetermined maximum number of buffers;
utilizing buffers identified in said queues up to said maximum number for the corresponding data stream as the respective data of the respective data stream arrives;
in response to a first one of said refresh events, determining the last one of said queues to receive said at least one additional buffer in response to said adding step;
performing said adding step for a selected one of said plurality of queues in response to the next refresh event following said first refresh event, based upon said determining step;
temporarily ceasing data storage for each one of said plurality of data streams for which the predetermined maximum number of buffers for the respective data stream has been utilized between successive ones of said refresh events; and
resuming storage of data for at least one of said plurality of data streams for which data storage ceased in response to the addition of said at least one additional free buffer to the queue associated with said at least one of said data streams for which data storage ceased.

7. The method of claim 6 wherein said receiving step comprises receiving a plurality of frame relay data is streams.

8. The method of claim 6 wherein said receiving step comprises receiving a plurality of frame relay data streams selected from the group consisting of T1, E1, T3 and E3 data streams.

9. The method of claim 6 wherein said receiving step comprises receiving a plurality of ATM data streams.

10. The method of claim 6 further comprising the steps of:
after said adding step determining the last one of said queues to receive said at least one additional buffer in response to a first refresh event of said adding step; and
performing said adding step for a selected one of said plurality of queues in response to the next refresh event following said first refresh event, based upon the determining step.

11. The method of claim 6 wherein said performing step further comprises beginning said adding step with the queue which was determined to be the last one of said queues to receive at least one additional buffer.

12. The method of claim 6 wherein said step of performing further comprises beginning said adding step with the queue which is identified in the circular list of queue identifiers as the queue which follows the queue determined to be the last one of said queues to receive at least one additional buffer.

13. The method of claim 6 wherein said determining step further comprises determining the last one of said queues to be allocated a sufficient number of buffers to replenish the respective queue up to the predetermined maximum number of buffers allocated to that queue; and wherein said performing step further comprises the step of beginning said adding step with the queue identified by the queue identifier which follows in the circular list of queue identifiers the queue identifier for the queue which was determined to be the last one of said queues to be allocated a sufficient number of buffers to replenish the respective queue to the predetermined maximum number of buffers allocated to the respective queue.

14. The method of claim 6 wherein said associating step further comprises providing a plurality of circular lists of queue identifiers wherein each list is associated with a predetermined priority level; and
identifying each queue with one of said plurality of circular lists.

15. The method of claim 14 wherein the adding step is performed for queues identified within higher priority circular lists prior to lower priority circular lists.

* * * * *